United States Patent
Tsumiyama et al.

(10) Patent No.: US 10,202,099 B2
(45) Date of Patent: Feb. 12, 2019

(54) UTILITY VEHICLE

(71) Applicant: KAWASAKI JUKOGYO KABUSHIKI KAISHA, Hyogo (JP)

(72) Inventors: Yoshinori Tsumiyama, Miki (JP); Teruaki Yamamoto, Himeji (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 78 days.

(21) Appl. No.: 15/393,367

(22) Filed: Dec. 29, 2016

(65) Prior Publication Data

US 2018/0186330 A1 Jul. 5, 2018

(51) Int. Cl.
*A47C 31/00* (2006.01)
*B60R 22/34* (2006.01)
*B60R 22/18* (2006.01)
*B60N 2/58* (2006.01)

(52) U.S. Cl.
CPC .............. *B60R 22/34* (2013.01); *B60N 2/58* (2013.01); *B60R 22/18* (2013.01)

(58) Field of Classification Search
CPC ....... B60R 22/26; B60R 22/023; B60R 22/24; B60R 22/34; B60R 22/22; B60R 22/20; B60R 2022/1818; B60R 2022/1812; B60R 2022/1806
USPC ....... 297/475, 473, 474, 479, 483, 486, 464, 297/468; 280/807, 801.1, 806; 24/268, 24/163 R
See application file for complete search history.

(56) References Cited

U.S. PATENT DOCUMENTS

| | | | |
|---|---|---|---|
| 6,234,529 B1* | 5/2001 | Ellison | B60R 22/24 280/808 |
| 6,419,271 B1* | 7/2002 | Yamada | B60R 22/1952 280/801.1 |
| 2006/0097505 A1* | 5/2006 | Midorikawa | B60R 21/013 280/806 |
| 2006/0194089 A1* | 8/2006 | Biegert | C08J 5/2218 29/623.5 |
| 2009/0094807 A1* | 4/2009 | Sugimoto | B60R 22/03 24/589.1 |
| 2009/0283994 A1* | 11/2009 | Ruthinowski | B60R 21/18 280/733 |
| 2010/0194089 A1* | 8/2010 | Ito | B60R 22/24 280/801.2 |
| 2012/0111986 A1* | 5/2012 | Fukuhara | B60R 22/34 242/398 |
| 2013/0009391 A1* | 1/2013 | Miller | B60R 22/46 280/806 |
| 2013/0168951 A1 | 7/2013 | Yamamoto et al. | |
| 2013/0168994 A1* | 7/2013 | Yamamoto | B62D 33/0273 296/63 |
| 2014/0054405 A1* | 2/2014 | Clark | B60R 22/405 242/383.2 |

(Continued)

*Primary Examiner* — Chi Q Nguyen
(74) *Attorney, Agent, or Firm* — Wenderoth, Lind & Ponack, L.L.P.

(57) ABSTRACT

A utility vehicle includes a seat having a seat cushion and a seat back, a seat back cover which covers a rear surface of the seat back, and a seat belt for restraining the occupant to the seat. The seat belt includes a belt, a tongue plate, an anchor disposed outside a seat cushion in a vehicle width direction, a buckle, and a retractor disposed substantially above the anchor for winding the belt. The seat back cover extends over the rear surface of the seat back and extends to a rear side of the retractor.

3 Claims, 14 Drawing Sheets

(56) References Cited

U.S. PATENT DOCUMENTS

2014/0217715 A1\* 8/2014 Minami .................. B60N 2/36
                                                    280/807
2015/0048609 A1\* 2/2015 Schramm .............. B60R 22/321
                                                    280/806

\* cited by examiner

UTILITY VEHICLE

BACKGROUND OF THE INVENTION

1. Technical Field

The present invention relates to a utility vehicle.

2. Description of Related Art

A seat belt which restrains an occupant to a seat is mounted in a vehicle. For example, U.S. Patent Application 2013/0168951 discloses a utility vehicle provided with a three-point-type seat belt. The three-point-type seat belt includes a belt, a tongue plate movably mounted on the belt, an anchor mounted on a distal end of the belt and disposed outside a seat cushion in a vehicle width direction, a buckle which is disposed inside the seat in the vehicle width direction and on which the tongue plate is detachably mounted, and a retractor disposed substantially above the anchor for winding the belt.

The retractor of the utility vehicle is fixed to a frame of a ROPS. Accordingly, for example, there is a possibility that luggage is brought into contact with the retractor during unloading the luggage from a carrier. There is also a possibility that hand luggage of an occupant who is going to leave a rear seat is brought into contact with the retractor of a front seat.

SUMMARY

Accordingly, it is an object of the present invention to provide a utility vehicle where it is possible to protect a retractor of a seat belt from unexpected collision.

To achieve the above-mentioned object, according to an aspect of the present invention, there is provided a utility vehicle which includes:

a seat having a seat cushion on which an occupant is seated and a seat back on which the occupant leans;

a seat back cover which covers a rear surface of the seat back; and a seat belt for restraining the occupant to the seat, wherein the seat belt includes:

a belt;

a tongue plate movably mounted on the belt;

an anchor mounted on a distal end of the belt and disposed outside a seat cushion in a vehicle width direction;

a buckle on which the tongue plate is detachably mounted; and a retractor disposed substantially above the anchor for winding the belt, and wherein the seat back cover extends over the rear surface of the seat back and extends to a rear side of the retractor.

According to the above-mentioned one aspect of the present invention, it is possible to protect the retractor of the seat belt from unexpected collision.

DETAILED DESCRIPTION

According to an aspect of the present invention, there is provided a utility vehicle which includes:

a seat having a seat cushion on which an occupant is seated and a seat back on which the occupant leans;

a seat back cover which covers a rear surface of the seat back; and a seat belt for restraining the occupant to the seat, wherein the seat belt includes:

a belt;

a tongue plate movably mounted on the belt;

an anchor mounted on a distal end of the belt and disposed outside a seat cushion in a vehicle width direction;

a buckle on which the tongue plate is detachably mounted; and a retractor disposed substantially above the anchor for winding the belt, and wherein the seat back cover extends over the rear surface of the seat back and extends to a rear side of the retractor.

For example, the seat back cover has a recessed portion which surrounds a portion of the retractor.

Further, for example, the utility vehicle includes a carrier disposed behind the seat back cover with a distance therebetween, the seat back cover includes a reinforcing rib which projects from a rear surface of the seat back cover and extends in a height direction, and the carrier has a recessed portion in which a distal end portion of the reinforcing rib of the seat back cover is accommodated.

Hereinafter, an embodiment is described in detail with reference to FIG. 1 to FIG. 14. FIG. 1 to FIG. 14 are views showing a utility vehicle according to one embodiment.

It is noted that descriptions in more detail than necessary may be omitted. For example, the detailed description of already well-known matters and the repeated description of substantially the same configuration may be omitted. This omission is made so as to avoid the description made hereinafter from becoming unnecessarily redundant and to facilitate the understanding of the present invention by those who are skilled in the art.

Further, the inventors of the present invention provide the accompanying drawings and the following description so that a person skilled in art can fully understand the present disclosure, and the accompanying drawings and the following description do not intend to limit the subject matter defined by the claims.

Furthermore, in this specification, "front", "rear", "left", and "right" are determined with reference to a driver who rides on a utility vehicle and drives the utility vehicle.

Figure 1:
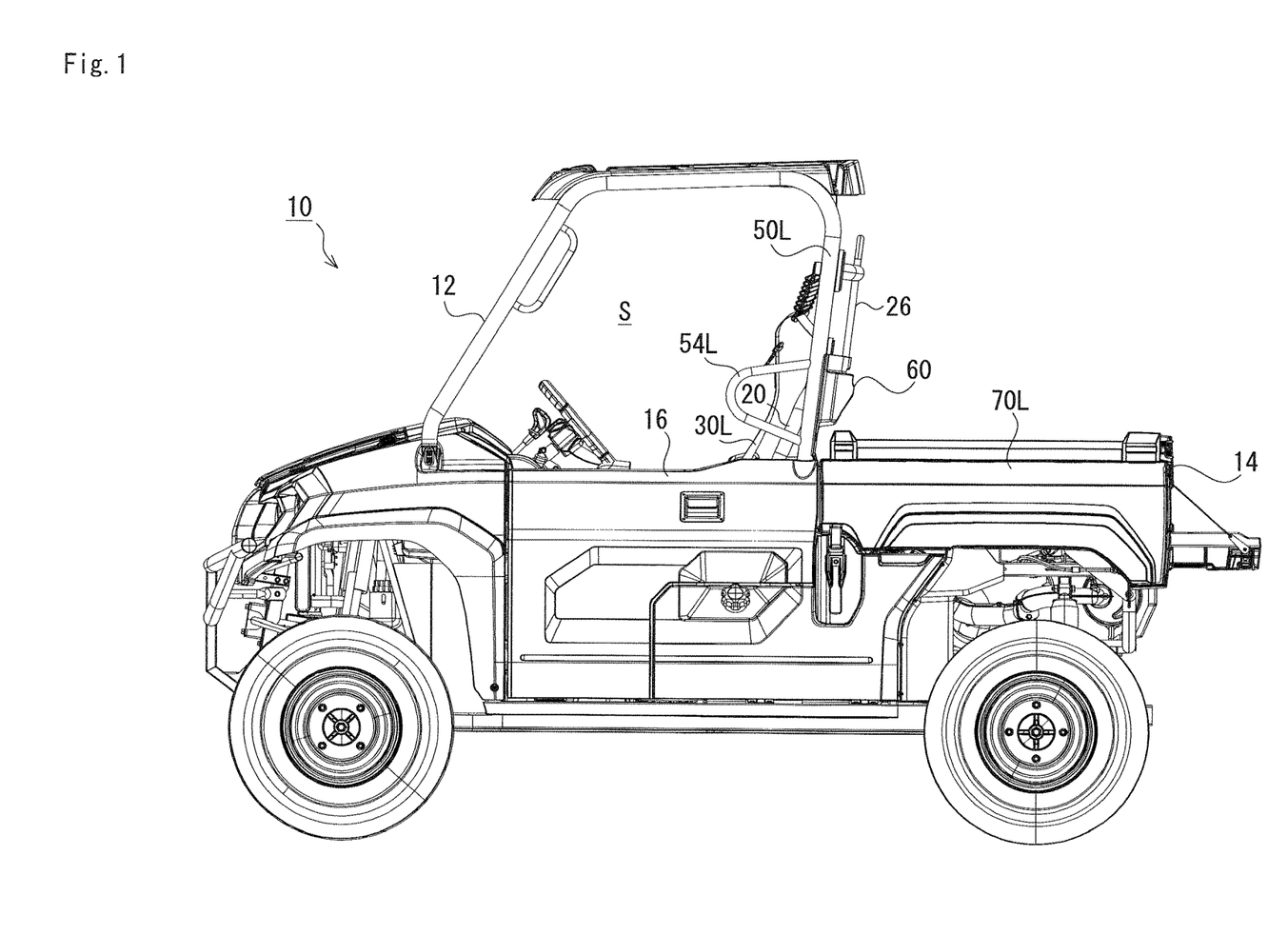
FIG. 1 is a side view of a utility vehicle according to an embodiment of the present invention.

As shown in FIG. 1, a utility vehicle 10 according to one embodiment of the present invention includes an ROPS (Rollover Protective Structure) 12 provided for protecting occupants, and a carrier 14 disposed behind the ROPS 12. In this embodiment, the utility vehicle 10 includes a pair of left and right doors 16 as optional parts (only the left door 16 shown in FIG. 1). The occupants ride in a riding space S surrounded by the ROPS 12 and the pair of doors 16.

Figure 2:
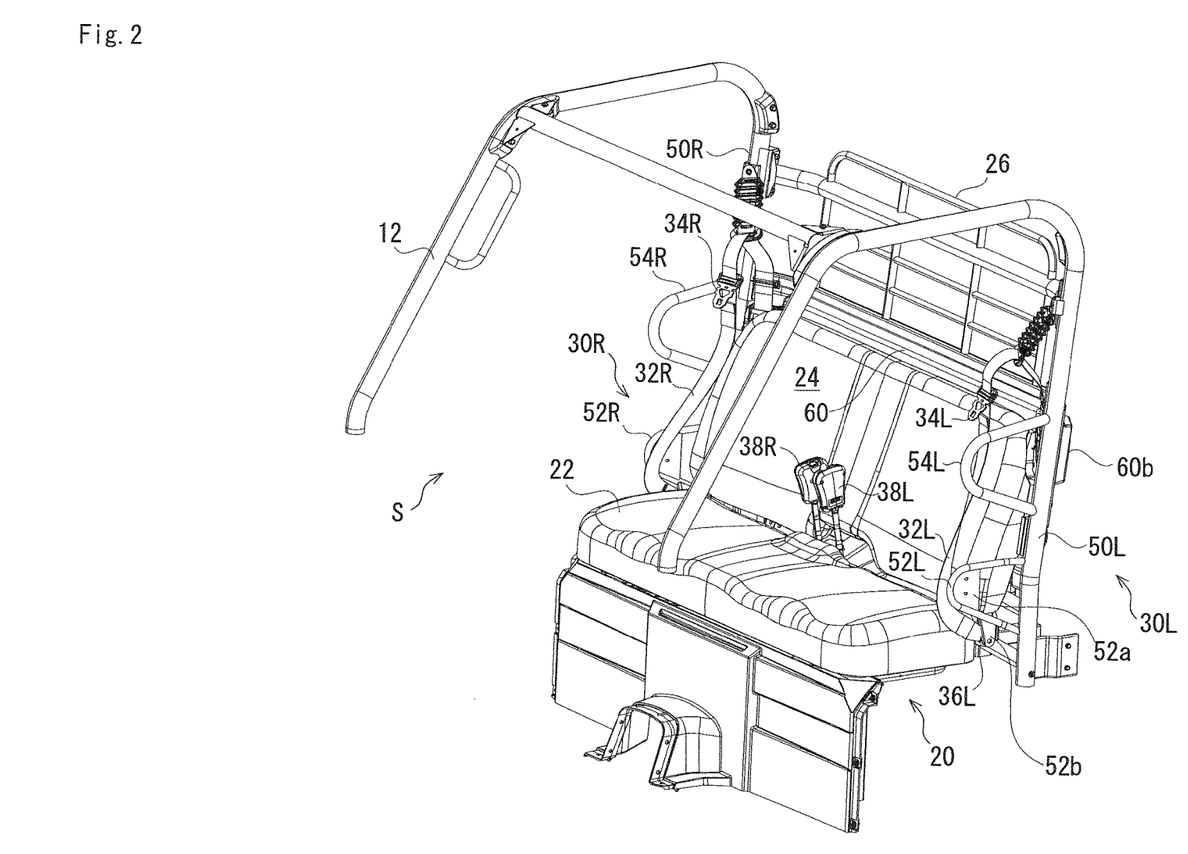
FIG. 2 is a front perspective view showing a riding space of the utility vehicle defined by an ROPS.
Figure 3:
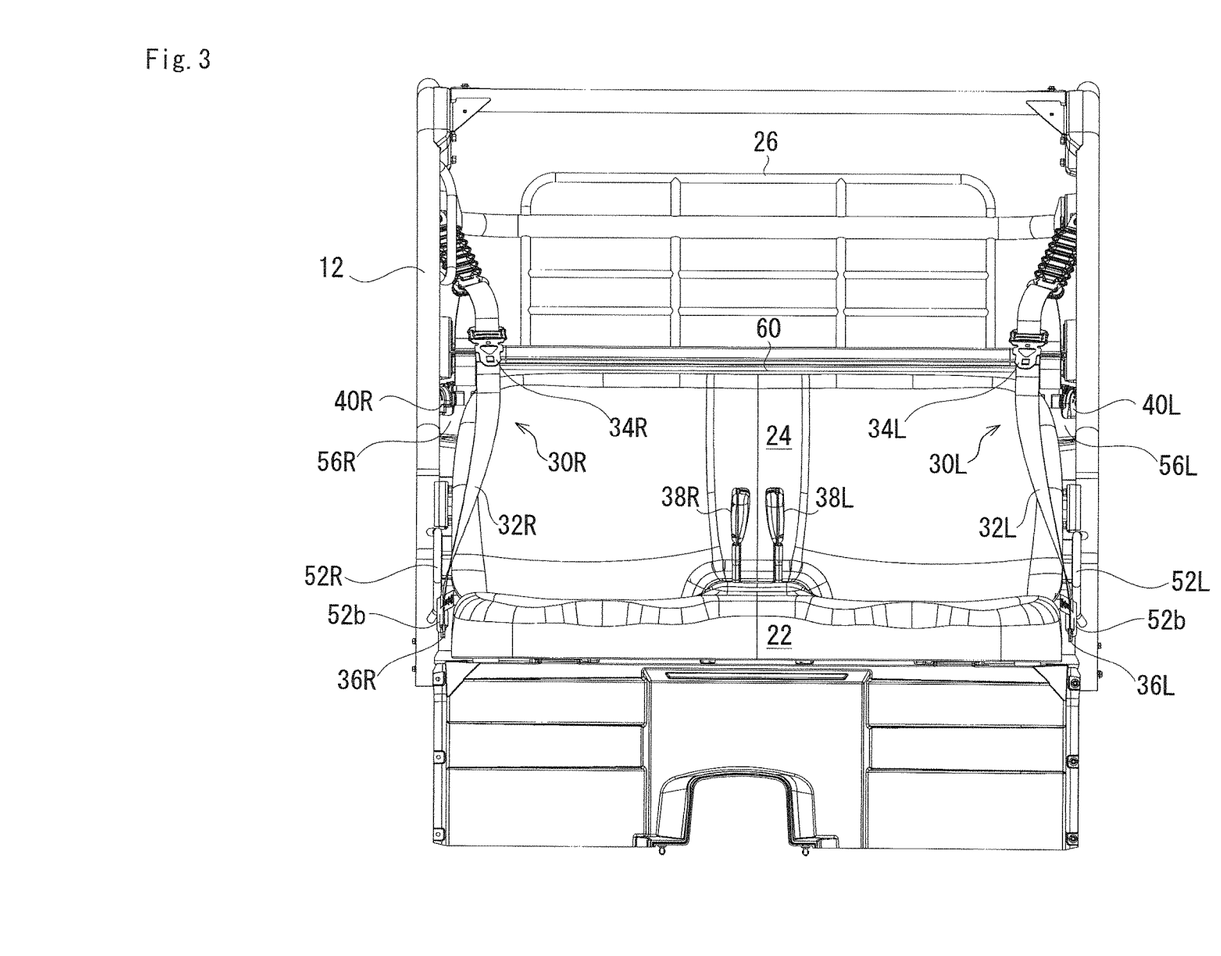
FIG. 3 is a front view showing the riding space.
Figure 4:
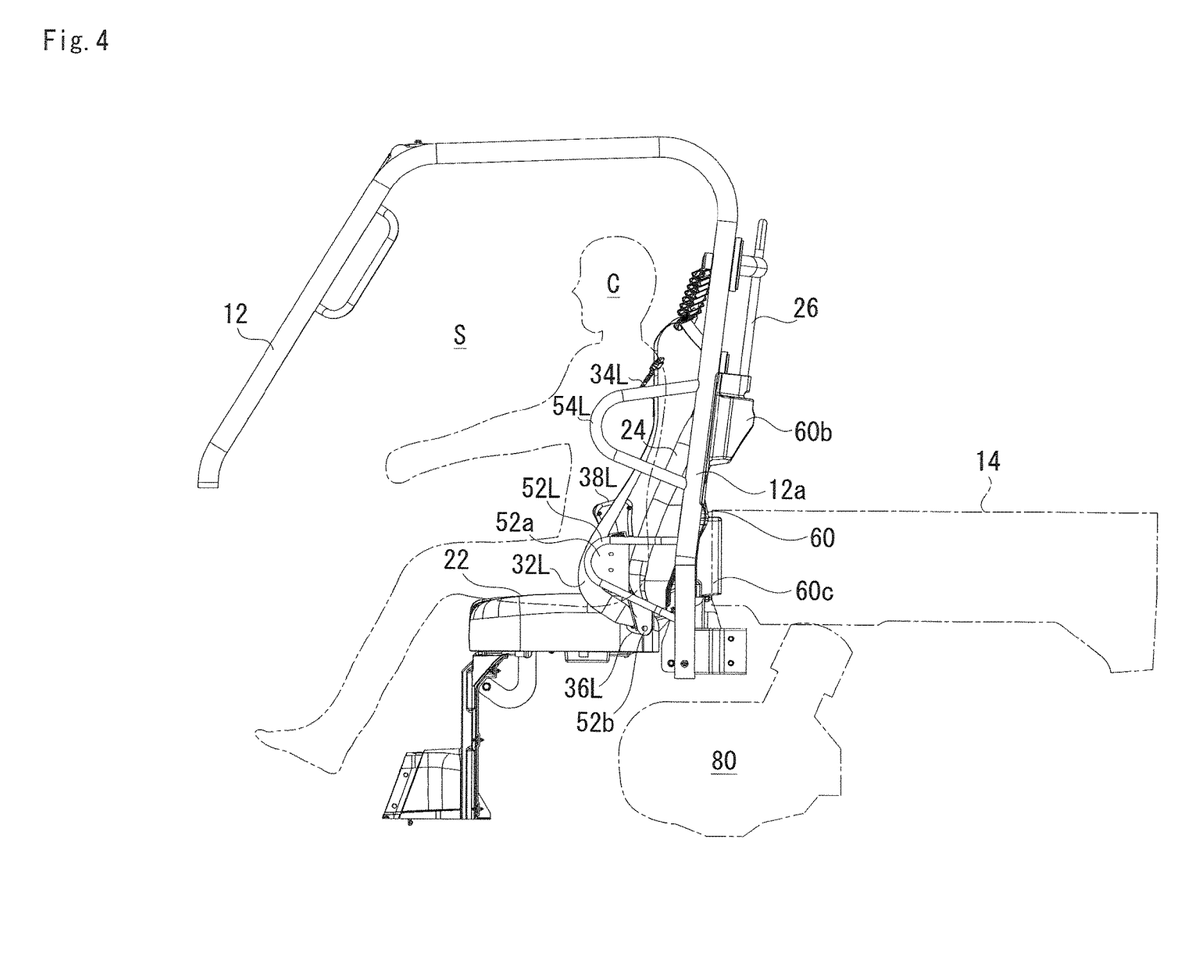
FIG. 4 is a side view of the riding space.
Figure 5:
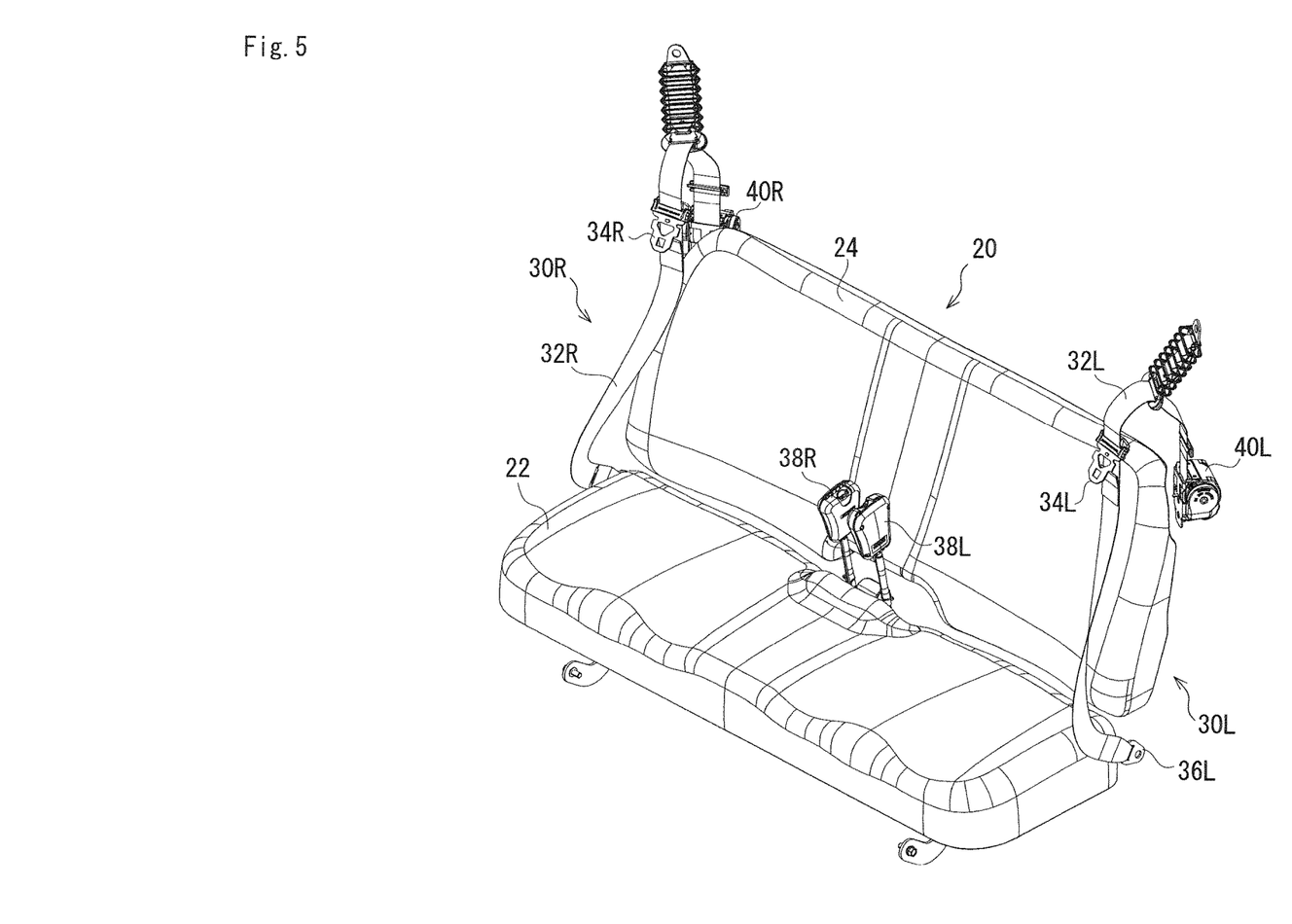
FIG. 5 is a front perspective view showing a seat and seat belts.
Figure 6:
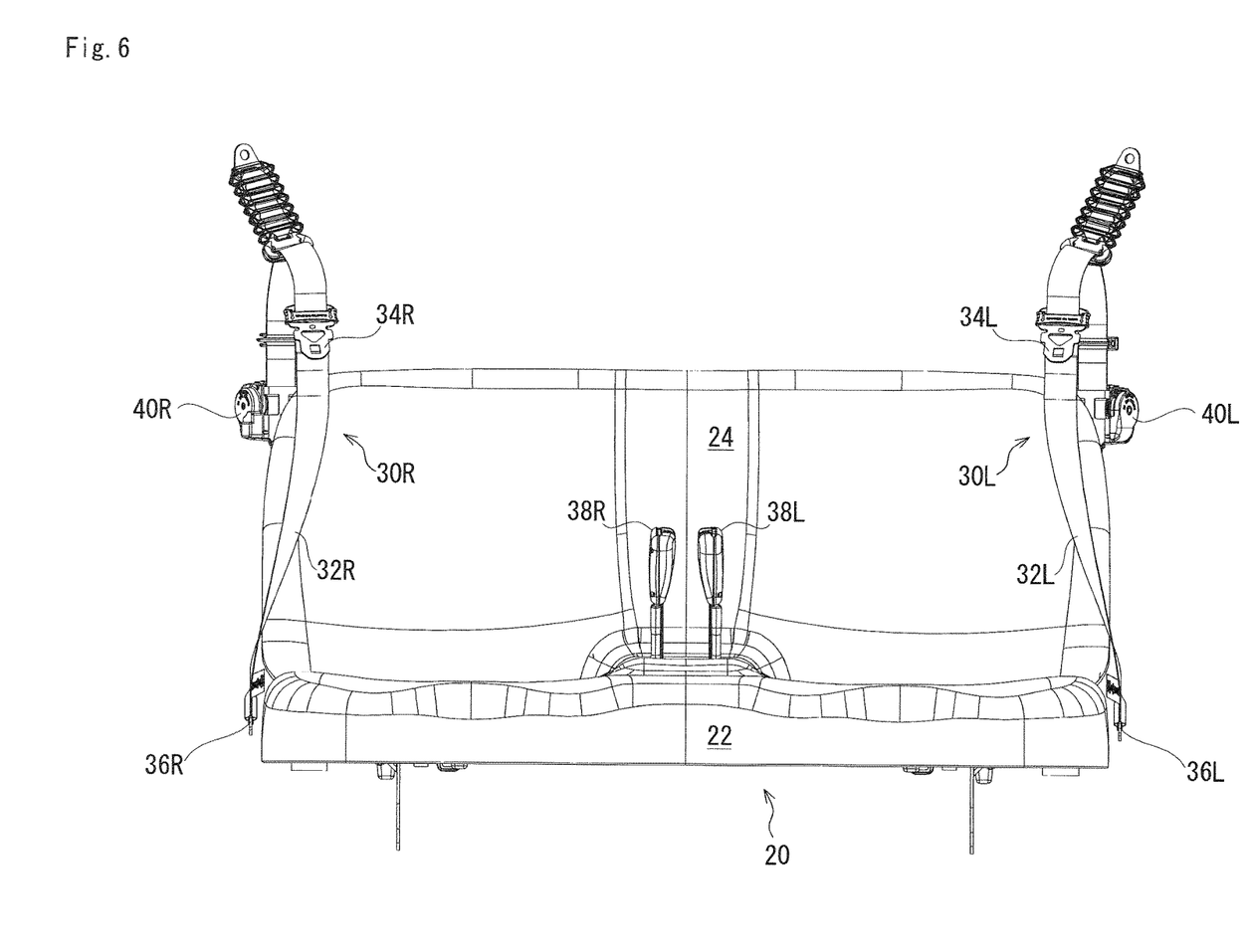
FIG. 6 is a front view showing the seat and the seat belts.
Figure 7:
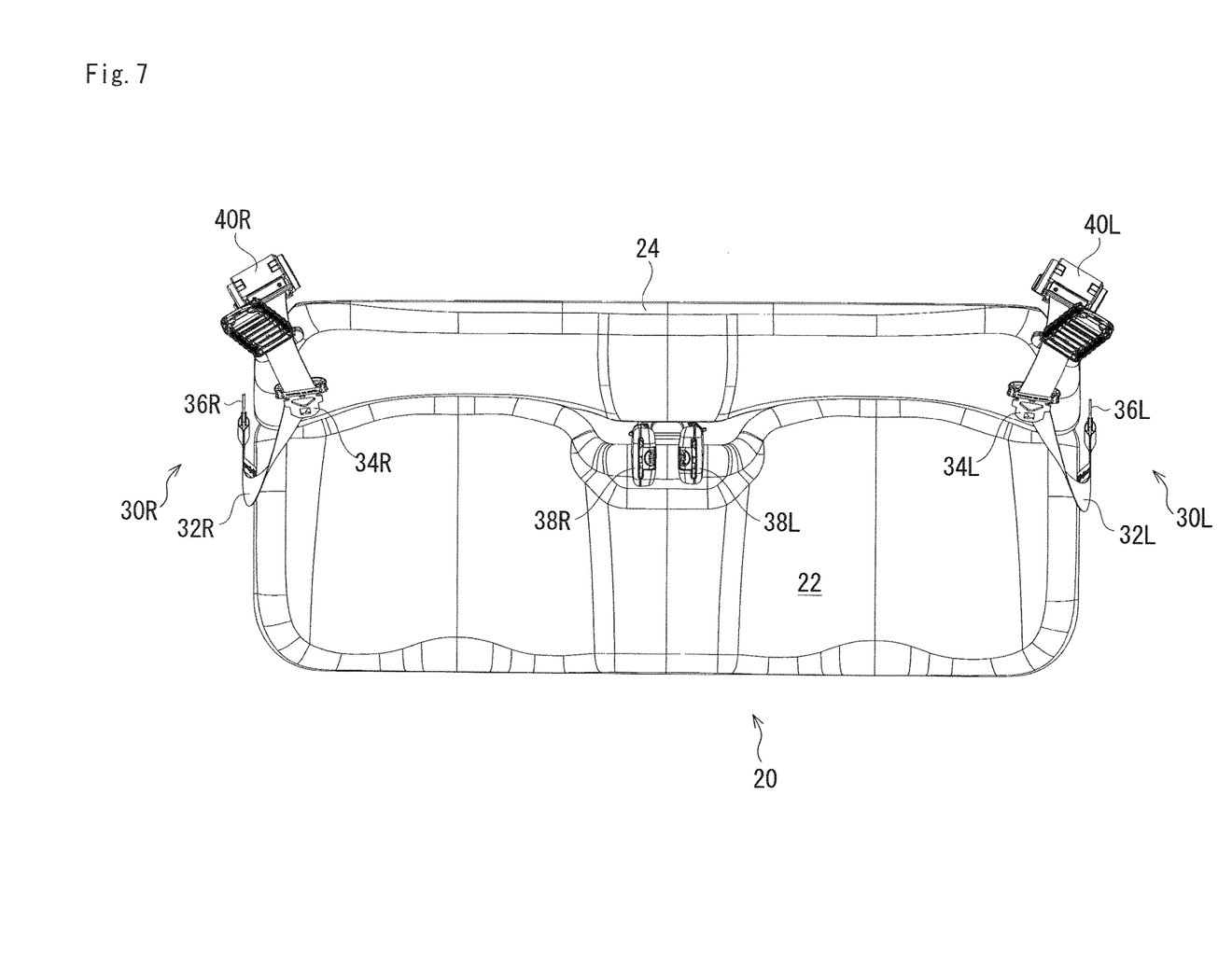
FIG. 7 is a top plan view showing the seat and the seat belts.

FIG. 2 to FIG. 4 are a perspective view, a front view, and a side view respectively showing the riding space in the ROPS. FIG. 5 to FIG. 7 are a perspective view, a front view, and a top plan view respectively showing a seat on which occupants are seated and seat belts.

As shown in FIG. 2 and FIG. 5, in this embodiment, the utility vehicle 10 includes a seat 20 for two occupants.

The seat 20 includes a seat cushion 22 on which the occupants are seated, and a seat back 24 on which the occupant leans. As shown in FIG. 4, the seat back 24 has a height which enables the seat back 24 to support a back of an occupant C seated on the seat 20. To protect a back of the head of the occupant C seated on the seat 20, as shown in FIG. 2, a screen 26 is mounted on the ROPS 12.

As shown in FIG. 5 to FIG. 7, the utility vehicle 10 further includes two sets of seat belts 30L, 30R for restraining the occupant C to the seat 20.

The seat belt 30L is a so-called three-point-type seat belt, and is provided for an occupant seated on a left half portion of the seat 20. The left seat belt 30L includes a belt 32L, a tongue plate 34L which is movably mounted on the belt 32L, an anchor 36L which is mounted on a distal end of the belt 32L, a buckle 38L on which the tongue plate 34L is detachably mounted, and a retractor 40L for winding the belt 32L.

The seat belt 30R is a three-point-type seat belt in the same manner as the seat belt 30L, and is provided for an occupant seated on a right half portion of the seat 20. The right seat belt 30R includes a belt 32R, a tongue plate 34R which is movably mounted on the belt 32R, an anchor 36R which is mounted on a distal end of the belt 32R, a buckle 38R on which the tongue plate 34R is detachably mounted, and a retractor 40R for winding the belt 32R.

The seat belts 30L, 30R have substantially the same configuration. Accordingly, hereinafter, there may be cases where only the seat belt 30L will be described. It should be understood, however, that such a description is also applicable to the seat belt 30R.

The buckles 38L, 38R of the seat belts 30L, 30R are mounted on a portion (see reference number 90 in FIG. 8) of a main frame of the utility vehicle 10. In this embodiment, the buckles 38L, 38R appear above the seat cushion 22 through a gap formed between the seat cushion 22 and the seat back 24 at the center in the vehicle width direction.

In the case where the utility vehicle is provided with one or two single seats, unlike this embodiment, a buckle is disposed on a side of a seat opposite to a side where an anchor is provided.

On the other hand, the anchors 36L, 36R and the retractors 40L, 40R of the seat belts 30L, 30R are mounted on the ROPS 12, to be more specific, on vertical frame portions 50L, 50R of the ROPS 12 extending in a vehicle height direction on both sides in the vehicle width direction with respect to the seat back 24.

Firstly, the vertical frame portions 50L, 50R of the ROPS 12 are described. As shown in FIG. 2, the seat back 24 of the seat 20 is disposed between the vertical frame portions 50L, 50R. A hip guard 52L and a shoulder guard 54L are mounted on the left vertical frame portion 50L. In the same manner, a hip guard 52R and a shoulder guard 54R are mounted on the right vertical frame portion 50R.

The hip guards 52L, 52R are members which extend frontward from the vertical frame portions 50L, 50R respectively. As shown in FIG. 4, the hip guard 52L (52R) is mounted on the vertical frame portion 50L (50R) such that the hip guard 52L (52R) is positioned outside a hip portion of the occupant C seated on the seat 20, particularly, the hip portion of the occupant C seated on the seat cushion 22 in a state where the occupant C leans on the seat back 24 in the vehicle width direction. That is, as shown in FIG. 4, as viewed in a vehicle width direction, a distal end portion of the hip guard 52L (52R) is positioned above the seat cushion 22 and in front of the seat back 24.

In this embodiment, the hip guards 52L, 52R are respectively formed of an approximately U-shaped pipe, and both ends of each hip guard 52L, 52R are connected to the vertical frame portion 50L, 50R by welding. In this embodiment, as shown in FIG. 1, the utility vehicle 10 includes the doors 16 as optional parts. In mounting the doors 16 as optional parts on the utility vehicle 10, the hip guards 52L, 52R respectively function as mounting members on which a door striker (not shown in the drawing) of the door 16 is mounted respectively. Accordingly, each hip guard 52L, 52R has a plate-like door striker attachment portion 52a on which the door striker is mounted. The door striker is mounted on an outer portion of each hip guard 52L, 52R in the vehicle width direction by way of the door striker attachment portion 52a.

The shoulder guards 54L, 54R are members which extend frontward from the vertical frame portions 50L, 50R respectively. As shown in FIG. 2, the shoulder guards 54L, 54R are disposed above the hip guards 52L, 52R respectively. As shown in FIG. 4, the shoulder guard 54L (54R) is mounted on the vertical frame portion 50L (50R) in a state where the shoulder guard 54L (54R) is positioned on a side of a breast portion or a shoulder portion of the occupant C seated on the seat 20.

In this embodiment, the shoulder guides 54L, 54R are respectively manufactured using an approximately U-shaped pipe, and both ends of each shoulder guide 54L, 54R are connected to the vertical frame portion 50L, 50R by welding.

The anchors 36L, 36R of the seat belts 20L, 20R are mounted on the hip guards 52L, 52R respectively in a rotatable manner by way of bolts, for example. In this embodiment, a tongue-shaped anchor attachment portion 52b which extends downward from a lower portion of each hip guard 52L, 52R is mounted on each hip guard 52L, 52R. As shown in FIG. 4, the anchor attachment portion 52b opposedly faces the seat cushion 22 with a distance therebetween in the vehicle width direction. When the doors 16 are mounted on the utility vehicle 10 as optional parts as shown in FIG. 1, the anchor attachment portion 52b is positioned between each door 16 and the seat cushion 22.

In this embodiment, the anchors 36L, 36R are rotatably mounted on the anchor attachment portions 52b of the hip guards 52L, 52R on a center side in the vehicle width direction, that is, on a seat cushion 22 side. Accordingly, the anchors 36L, 36R are disposed outside the seat cushion 22 in the vehicle width direction respectively. Due to such a configuration, contacting of the anchor 36L, 36R with the occupant C seated on the seat 20 is suppressed so that the anchor 36L, 36R is freely rotatable. As a result, the occupant C can smoothly perform mounting and dismounting of the seat belt 30L, 30R.

As shown in FIG. 6, the retractors 40L, 40R of the seat belts 30L, 30R are disposed substantially above the anchors 36L, 36R respectively. In this embodiment, as viewed from a front side, portions of the retractors 40L, 40R are hidden by the seat back 24 and remaining portions of the retractors 40L, 40R are projected to the outside in the vehicle width direction from the seat back 24 respectively. That is, the retractors 40L, 40R are positioned behind the seat back 24.

In this embodiment, as shown in FIG. 3, the retractors 40L, 40R are mounted on retractor mount portions 56L, 56R which are mounted on the vertical frame portions 50L, 50R of the ROPS 12 respectively. The retractor mount portions 56L, 56R are described with reference to FIG. 8.

Figure 8:
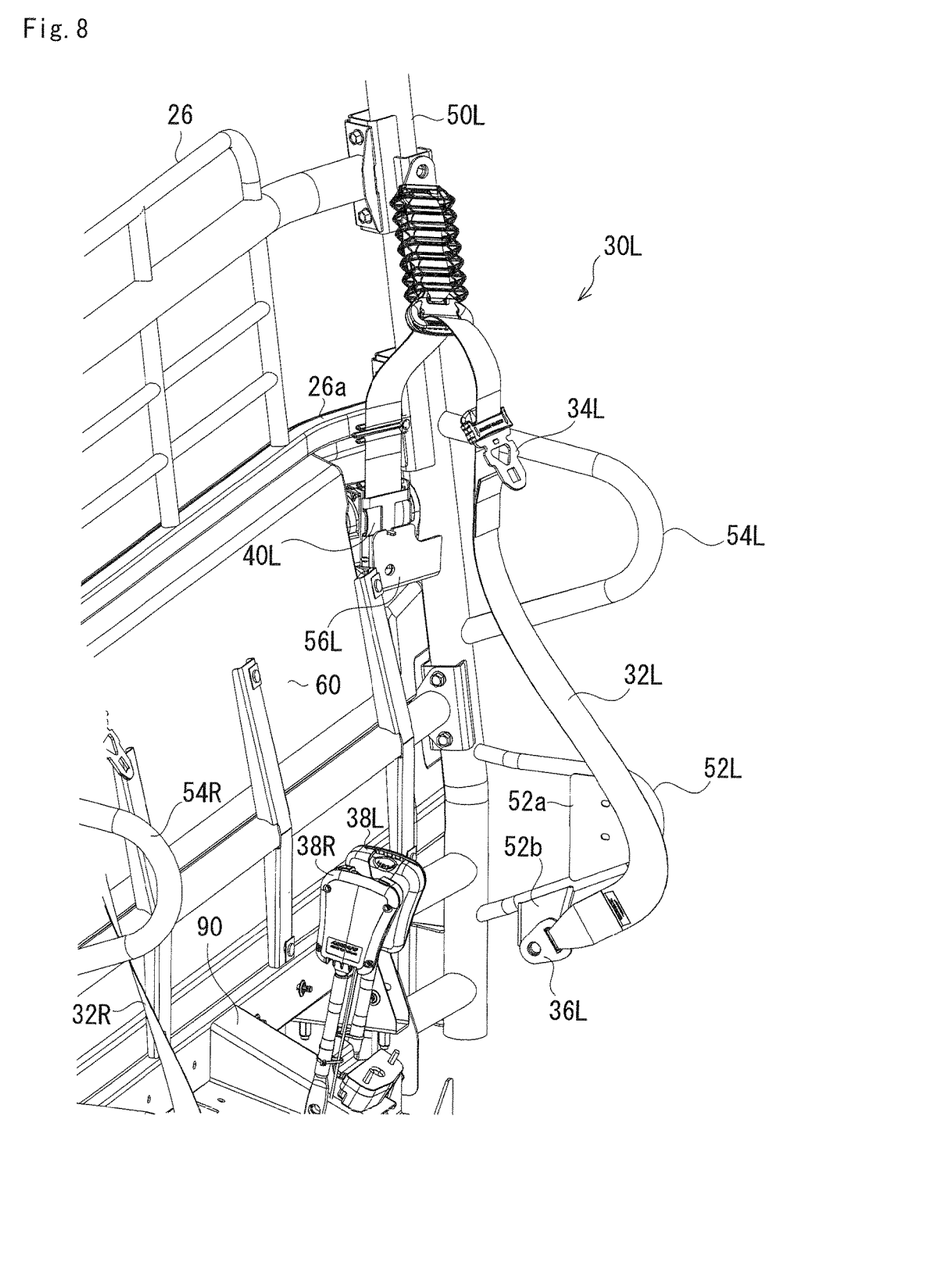
FIG. 8 is a perspective view showing mounting of the left seat belt on the ROPS.

FIG. 8 is a view showing mounting of the seat belt 30L on the vertical frame portion 50L in a state where the seat 20 is removed. As shown in FIG. 8, the retractor mount portion 56L (56R) is mounted on the vertical frame portion SOL (50R) such that the retractor mount portion 56L (56R) is positioned at substantially the same height as the shoulder guard 54L (54R). Further, the retractor mount portion 56L (56R) is mounted on the vertical frame portion 50L (50R) such that the retractor mount portion 56L (56R) projects toward the center in the vehicle width direction and toward a rear side from the vertical frame portion 50L (50R). With such a configuration, as shown in FIG. 7, the retractors 40L, 40R mounted on the retractor mount portions 56L (56R) are directed toward the center in the vehicle width direction. As a result, the occupant C seated on the seat 20 can easily pull the tongue plate 34L, 34R disposed between the anchor 32L, 32R and the retractor 40L, 40R toward the buckle 38L, 38R.

As described above, as shown in FIG. 8, in this embodiment, the anchor 36L (36R) is mounted on a seat-cushion-22-side portion of the hip guard 52L (52R) (the anchor attachment portion 52b of the hip guard 52L (52R)). Further, as shown in FIG. 7, the retractors 40L, 40R are directed toward the center in the vehicle width direction. Accordingly, the belts 32L, 32R are minimally routed toward the outside in the vehicle width direction with respect to the hip guard 52L (52R). As a result, the occupant C can mount the seat belt 30L (30R) thereon without being obstructed by the hip guard 52L (52R). To allow the occupant C to mount the seat belt 30L (30R) without being obstructed by the hip guard 52L (52R), as shown in FIG. 8, it is preferable that the anchor attachment portion 52b project toward the center in the vehicle width direction while projecting downward from the hip guard 52L (52R).

Figure 9:
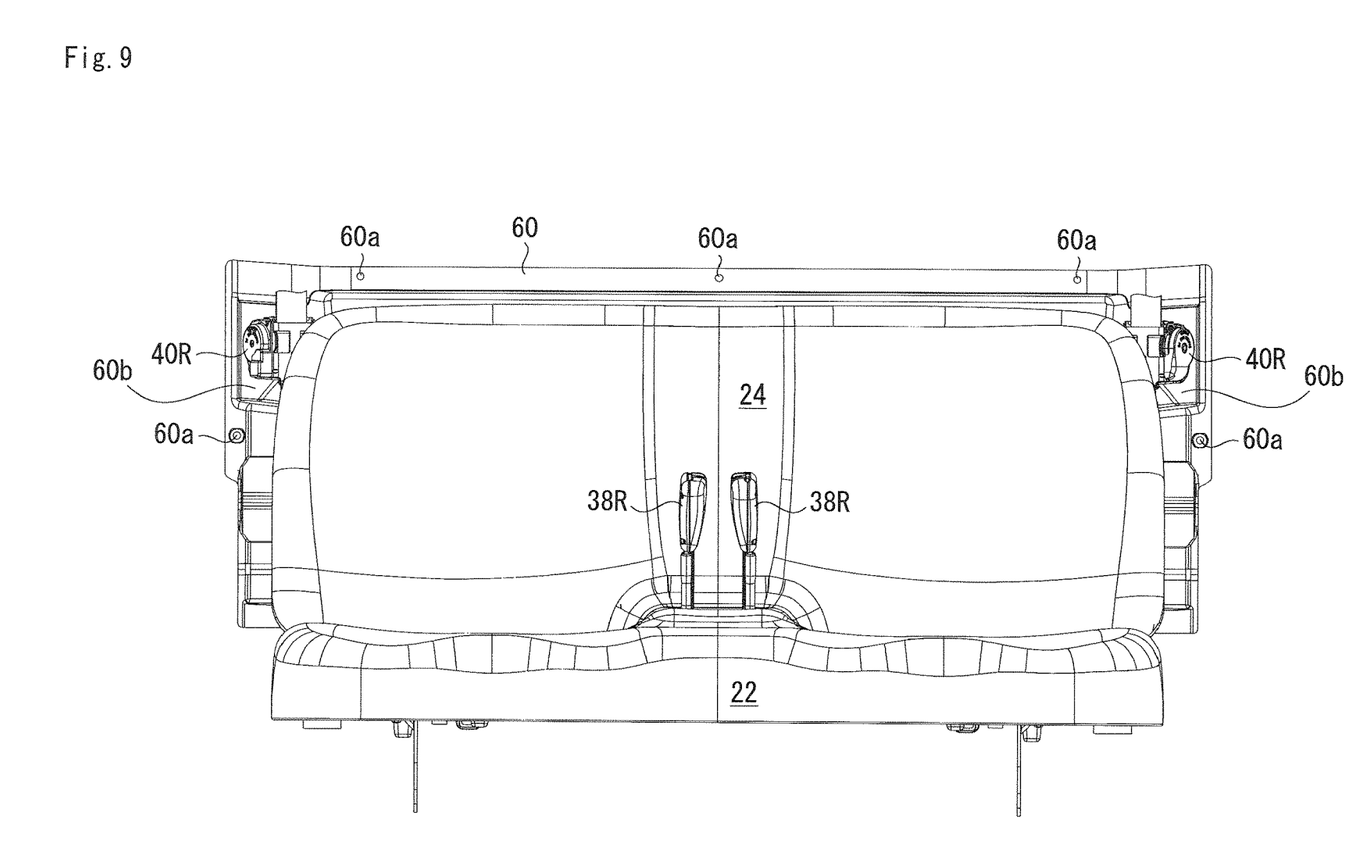
FIG. 9 is a front view showing the seat, retractors, and a seatback cover.

As shown in FIG. 9, the retractors 40L, 40R are also protected by a seat back cover 60 which covers a rear surface of the seat back 24. The seat back cover 60 is described hereinafter.

Figure 10:
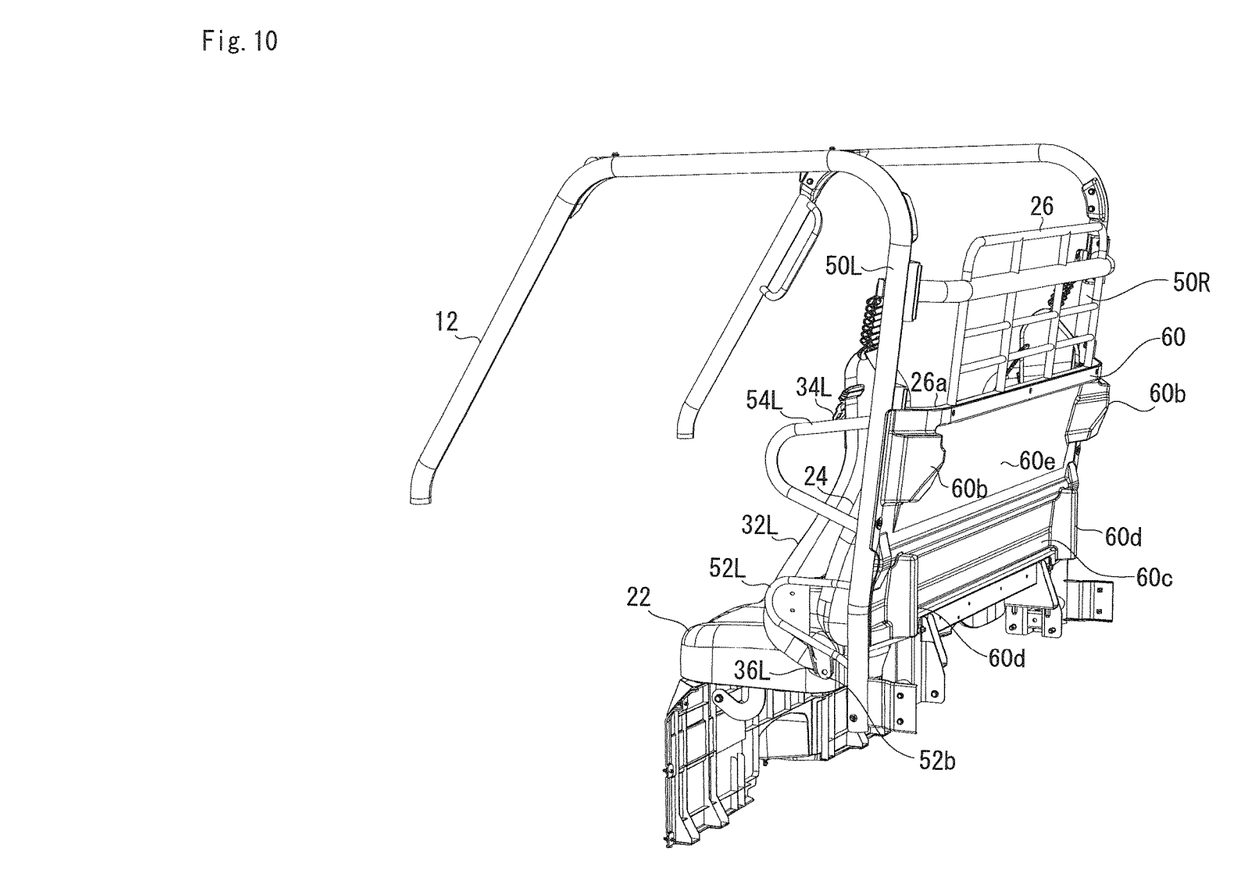
FIG. 10 is a rear perspective view showing the seatback cover in a cover mounted state.
Figure 11:
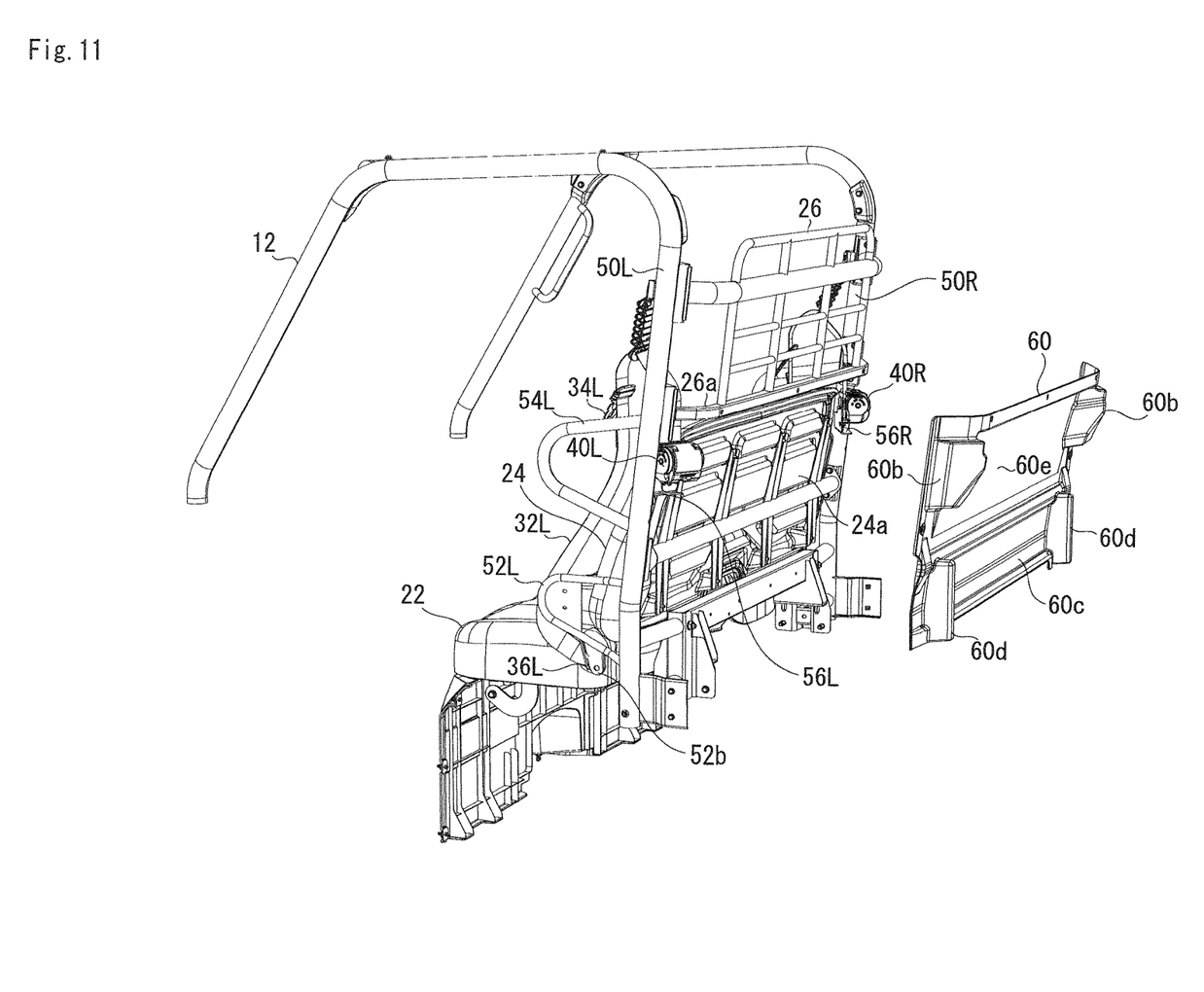
FIG. 11 is a rear perspective view showing the seatback cover in a cover removed state.
Figure 12:
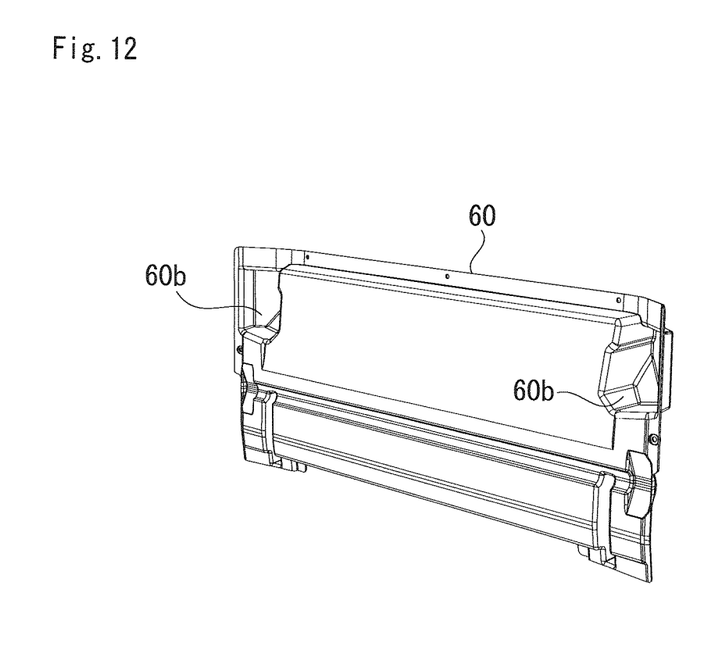
FIG. 12 is a front perspective view showing a front surface of the seatback cover.

FIG. 10 shows a state where the rear surface of the seat back 24 is covered by the seat back cover 60. FIG. 11 shows a state where the seat back cover 60 is removed. Further, FIG. 12 shows a front surface of the seat back cover 60.

As shown in FIG. 10 and FIG. 11, the seat back cover 60 is a cover which covers the rear surface 24a of the seat back 24 by taking protective performance and a design into consideration. The seat back cover 60 is made of a light resin material, for example. In this embodiment, as shown in FIG. 10, the seat back cover 60 is mounted on a lower beam portion 26a of the screen 26 and the vertical frame portions 50L, 50R of the ROPS 12 using a plurality of bolts (not shown in the drawing) which respectively pass through a plurality of through holes 60a shown in FIG. 9.

As shown in FIG. 9, as viewed from a front side, the seat back cover 60 is larger than the seat back 24 in size. That is, the seat back cover 60 extends over the rear surface 24a of the seat back 24 and extends to a rear side of the retractors 40L, 40R.

To be more specific, to protect the retractors 40L, 40R from an inadvertent impact from behind, the seat back cover 60 extends to the rear side of the retractors 40L, 40R. Due to the provision of the seat back cover 60, for example, it is possible to prevent a luggage in the carrier 14 from being brought into contact with rear portions of the retractors 40L, 40R during unloading the luggage from the carrier 14. With such a configuration, it is possible to suppress that the retractors 40L, 40R are damaged.

As shown in FIG. 12, to further protect the retractors 40L, 40R, the seat back cover 60 has concave-shaped retractor pocket portions 60b which surround portions of the retractors 40L, 40R respectively. The retractors 40L, 40R are partially accommodated in the retractor pocket portions 60b respectively so that the retractors 40L, 40R are further protected. Thus, as shown in FIG. 10 (as compared with FIG. 11), the seat back cover 60 conceals both the retractors 40L, 40R and the rear surface of the seat back 24 as viewed from a rear side of the utility vehicle. Also, the retractor pocket portions 60b prevent any foreign matter from getting inside the retractors 40L, 40R. Further, due to the provision of the retractor pockets 60b, the spreading of noise generated from the retractors 40L, 40R due to pulling or winding of the belts 32L, 32R can be suppressed.

The protection of the retractors 40L, 40R by the seat back cover 60 can acquire another advantageous effect. That is, it is unnecessary to provide a protective cover to the respective retractors 40L, 40R individually. Due to such an advantageous effect, the number of parts of the utility vehicle 10 can be reduced and, at the same time, a manufacturing time (assembling time) of the utility vehicle 10 can be shortened.

The seat back cover 60 is configured to play another two roles in addition to the role of covering the rear surface 24a of the seat back 24 and protecting the retractors 40L, 40R.

First, the seat back cover 60 includes plate-like reinforcing ribs 60d each of which projects rearward and extends in the height direction on a lower half portion 60c. The lower half portion 60c of the seat back 60 is disposed between the seat back 24 and the carrier 14.

The reinforcing ribs 60d suppress the deformation of the seat back cover 60, particularly, the deformation of the lower half portion 60c of the seat back cover 60. As shown in FIG. 1, the reinforcing ribs 60d have a function of making a gap formed between the seat 20 (the door 16 in this embodiment) and the carrier 14 not conspicuous when the utility vehicle 10 is viewed in the vehicle width direction.

Figure 13:
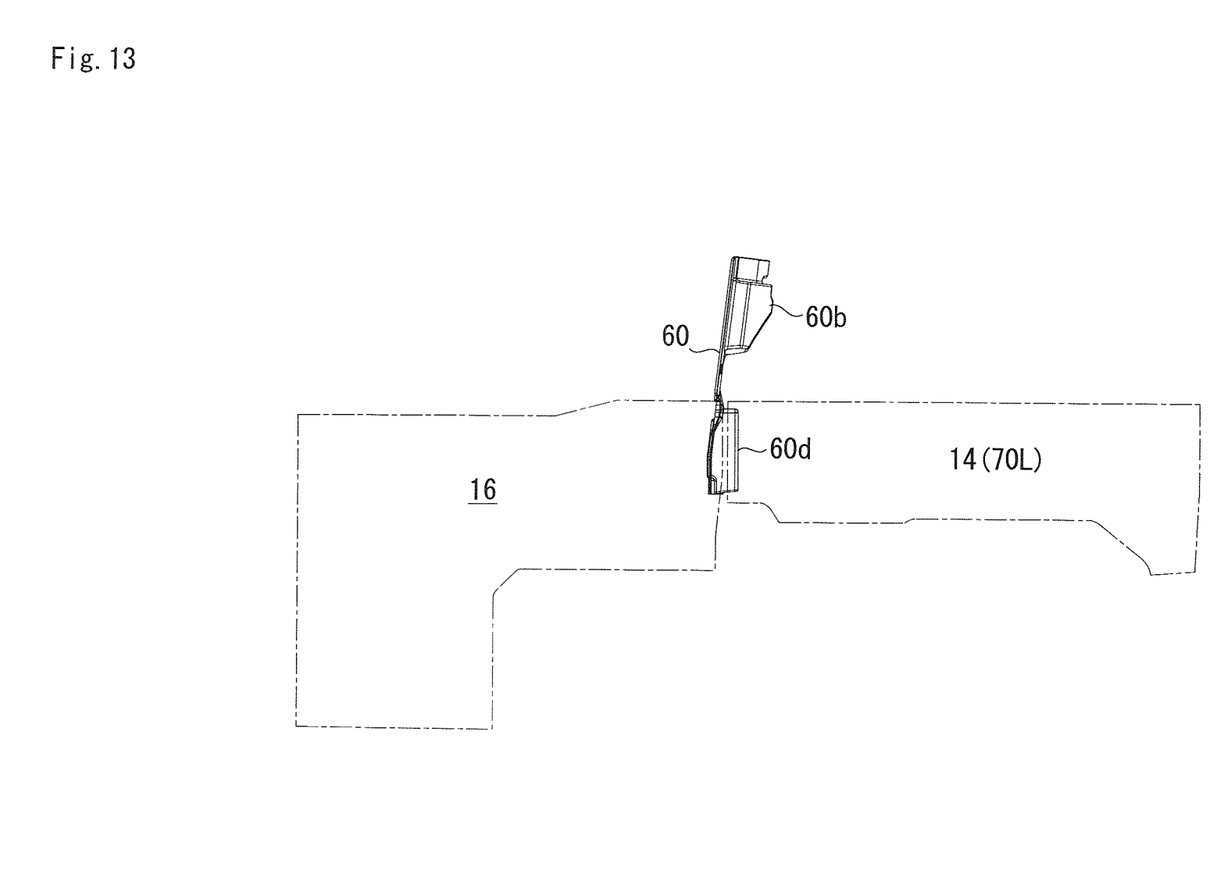
FIG. 13 is a view for describing another role of a reinforcing rib of the seatback cover.

As shown in FIG. 13, the reinforcing rib 60d of the seat back cover 60 overlaps with the gap formed between the door 16 and the carrier 14 (a left side wall panel 70L of the carrier 14). That is, the reinforcing rib 60d partially overlaps with the carrier 14.

Assuming a case where the seat back cover 60 does not have such a reinforcing rib 60d, a person can see a scenery on a side opposite to a side where the person stands through a gap formed between the door 16 and the carrier 14. Accordingly, the continuity of a side surface of the utility vehicle is lost and hence, a design of the side surface is lowered.

Since the reinforcing rib 60d functions as a blinding plate, a person cannot see a scenery on a side opposite to a side where the person stands through the gap formed between the door 16 and the carrier 14. As a result, lowering of a design of the side surface of the utility vehicle 10 is suppressed.

Figure 14:
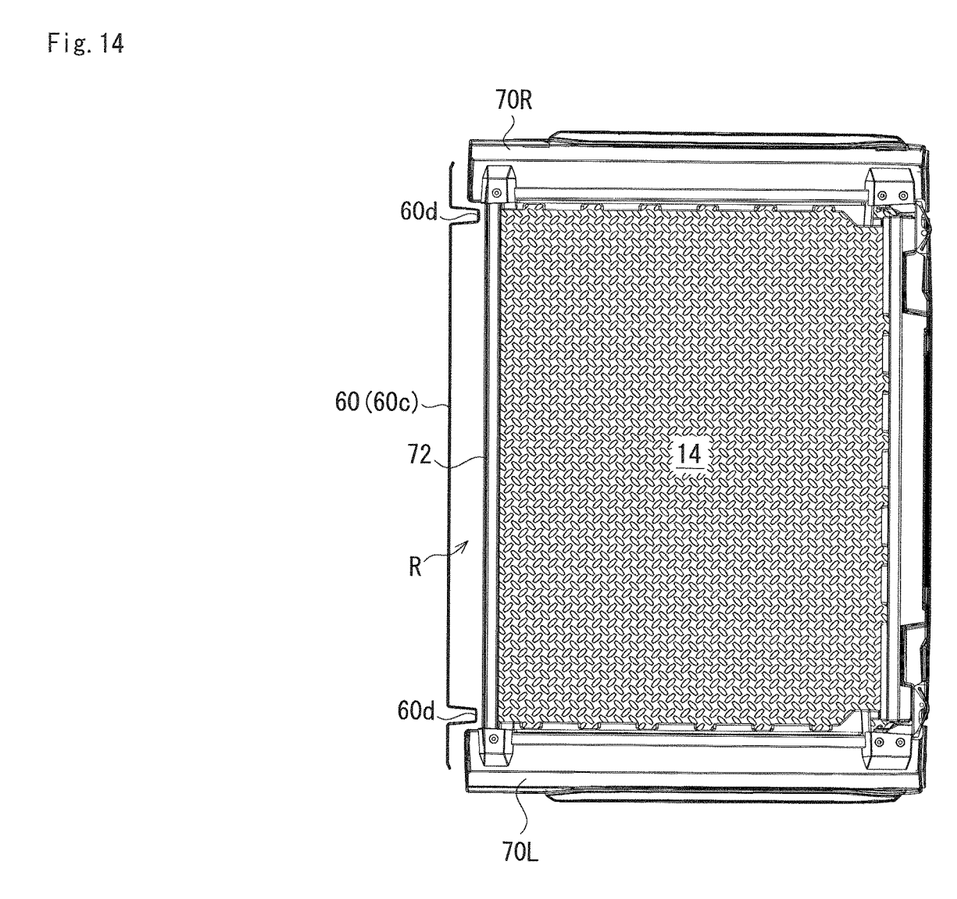
FIG. 14 is a top plan view showing the seatback cover and a carrier.

The reinforcing rib 60*d* functions as a blinding plate. That is, as shown in FIG. 13, the reinforcing rib 60*d* partially overlaps with the carrier 14. Accordingly, as shown in FIG. 14, the carrier 14 has a recessed portion R in which a distal end portion of the reinforcing rib 60*d* is accommodated. In this embodiment, a left side wall panel 70L, and a right side wall panel 70R of the carrier 14 respectively extend frontward beyond a front side wall panel 72. The recessed portion R which accommodates distal end portions of the reinforcing ribs 60*d* is formed between the extending portions of the left side wall panel 70L and the right side wall panel 70R.

Secondly, as shown in FIG. 4, the seat back cover 60 plays a role of keeping an occupant away from exhaust heat from an engine 80.

As shown in FIG. 4, the engine 80 of the utility vehicle 10 is mounted on the utility vehicle 10 in a state where a front portion of the engine 80 is disposed below the seat cushion 22. Accordingly, exhaust heat (high temperature air) from the engine 80 elevates through a gap formed between the seat back 24 and the carrier 14.

To prevent the occupant C seated on the seat 20 from being exposed to exhaust heat from the engine 80, as shown in FIG. 10, the seat back 24 has a guide surface 60*e* which guides elevating exhaust heat so as to keep the occupant C away from the exhaust heat. The guide surface 60*e* is an overhang surface extending toward an upper side from a lower side in an oblique rearward direction.

As described above, to exemplify the technical feature of the present invention as an example, the embodiment has been described, and the description has been made with reference to the accompanying drawings and the detailed description. Therefore, the constitutional elements described in the accompanying drawings and the detailed description include not only constitutional elements which are indispensable for solving the problems of the present invention but also constitutional elements which are not indispensable for solving the problems of the present invention and are provided for an exemplifying purpose. Accordingly, it should not be construed that the fact that constitutional elements which are not indispensable for solving the problems of the present invention are described in accompanying drawings and the detailed description readily verifies that the constitutional elements which are not indispensable for solving the problems of the present invention are also included in the constitutional elements which are indispensable for solving the problems of the present invention.

Further, the above-mentioned embodiment is provided for exemplifying the technique relating to the present invention and hence, various modifications, alterations, additions and omissions and the like of the present invention can be made within scope of claims or within a range equivalent to scope of claims.

The invention claimed is:

1. A utility vehicle comprising:
 a seat having a seat cushion on which an occupant is seated, and a seat back on which the occupant leans;
 a seat back cover which covers a rear surface of the seat back; and
 a seat belt for restraining the occupant to the seat, wherein the seat belt comprises:
  a belt;
  a tongue plate movably mounted on the belt;
  an anchor mounted on a distal end of the belt and disposed outside a seat cushion in a vehicle width direction;
  a buckle on which the tongue plate is detachably mounted; and
  a retractor disposed substantially above the anchor for winding the belt, and
 wherein the seat back cover extends over the rear surface of the seat back and extends to a rear side of the retractor such that the seat back cover conceals both the retractor and the rear surface of the seat back as viewed from a rear side of the utility vehicle.

2. The utility vehicle according to claim 1, wherein the seat back cover has a seat back cover recessed portion which surrounds a portion of the retractor.

3. The utility vehicle according to claim 1, wherein the utility vehicle further comprises a carrier disposed behind the seat back cover with a distance therebetween,
 the seat back cover includes a reinforcing rib which projects from a rear surface of the seat back cover and extends in a height direction, and
 the carrier has a carrier recessed portion in which a distal end portion of the reinforcing rib of the seat back cover is accommodated.

* * * * *